(12) United States Patent
Samowicz et al.

(10) Patent No.: US 9,262,474 B2
(45) Date of Patent: Feb. 16, 2016

(54) DYNAMIC DOMAIN QUERY AND QUERY TRANSLATION

(75) Inventors: Maciej Samowicz, Redmond, WA (US); Scott A. Konersmann, Monroe, WA (US); Muthiah M Muthaia Chettiar, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 533 days.

(21) Appl. No.: 12/895,532

(22) Filed: Sep. 30, 2010

(65) Prior Publication Data

US 2012/0084301 A1 Apr. 5, 2012

(51) Int. Cl.
*G06F 17/00* (2006.01)
*G06F 17/30* (2006.01)
*G06F 7/00* (2006.01)

(52) U.S. Cl.
CPC .... *G06F 17/30427* (2013.01); *G06F 17/30519* (2013.01); *G06F 17/30867* (2013.01)

(58) Field of Classification Search
CPC ............... G06F 17/30427; G06F 17/30519; G06F 17/30867
USPC ................. 707/760, 999.001–999.005, 759
See application file for complete search history.

(56) References Cited

U.S. PATENT DOCUMENTS

| | | | |
|---|---|---|---|
| 5,542,078 A | 7/1996 | Martel et al. | |
| 5,838,965 A | 11/1998 | Kavanagh et al. | |
| 6,167,449 A * | 12/2000 | Arnold et al. | 709/227 |
| 6,871,346 B1 | 3/2005 | Kumbalimutt et al. | |
| 7,197,491 B1 * | 3/2007 | Chou et al. | 707/999.001 |
| 7,222,147 B1 | 5/2007 | Black et al. | |
| 7,272,833 B2 * | 9/2007 | Yaung | 719/314 |
| 7,409,386 B2 * | 8/2008 | Hongell et al. | 707/763 |
| 7,454,413 B2 | 11/2008 | Lakshminarayanan et al. | |
| 7,656,822 B1 * | 2/2010 | AbdelAziz et al. | 370/255 |
| 7,933,290 B2 * | 4/2011 | Aholainen | 370/466 |

(Continued)

FOREIGN PATENT DOCUMENTS

CN 101047512 A 10/2007

OTHER PUBLICATIONS

Dinesh Kulkarni et. al., LINQ to SQL: .NET Language-Integrated Query for Relational Data, Pub. Date Mar. 2007 (1 page).

(Continued)

*Primary Examiner* — Kannan Shanmugasundaram
(74) *Attorney, Agent, or Firm* — Nicholas Chen; Doug Barker; Micky Minhas (57) ABSTRACT

Embodiments are directed to defining a query expression over a dynamic system model and to transforming a dynamically built query expression into a simplified, canonical form. A computer system receives various user inputs that are to be included as part of a query expression for querying a dynamic system model. The dynamic system model is queryable to determine features provided by a service hosted by a back-end server. The computer system dynamically builds the query expression based on both the received inputs and the available features provided by the service as indicated by the dynamic system model. The query expression also includes metadata structures representing those features of the service which are provided by the service. The computer system also queries across the dynamic system model using the dynamically built query expression to retrieve and provide the service features requested in the received user input.

19 Claims, 4 Drawing Sheets

(56) References Cited

U.S. PATENT DOCUMENTS

| | | | |
|---|---|---|---|
| 7,987,163 B2* | 7/2011 | Keshavarz-Nia et al. | 707/694 |
| 2003/0140119 A1* | 7/2003 | Acharya et al. | 709/219 |
| 2004/0236633 A1* | 11/2004 | Knauerhase et al. | 705/26 |
| 2005/0004816 A1 | 1/2005 | Abraham-Fuchs et al. | |
| 2005/0097087 A1* | 5/2005 | Punaganti Venkata et al. | 707/3 |
| 2005/0220139 A1* | 10/2005 | Aholainen | 370/466 |
| 2005/0234873 A1* | 10/2005 | Milligan et al. | 707/3 |
| 2006/0004717 A1* | 1/2006 | Ramarathnam et al. | 707/3 |
| 2006/0026585 A1 | 2/2006 | Haselden et al. | |
| 2006/0047649 A1* | 3/2006 | Liang | 707/4 |
| 2006/0146731 A1* | 7/2006 | Lewis et al. | 370/254 |
| 2006/0150182 A1 | 7/2006 | Hughes et al. | |
| 2007/0016570 A1* | 1/2007 | Punaganti Venkata et al. | 707/4 |
| 2009/0144229 A1 | 6/2009 | Meijer et al. | |
| 2009/0150367 A1 | 6/2009 | Melnik et al. | |
| 2009/0204612 A1* | 8/2009 | Keshavarz-Nia et al. | 707/6 |
| 2009/0319501 A1 | 12/2009 | Goldstein et al. | |
| 2009/0328016 A1 | 12/2009 | Ng et al. | |

OTHER PUBLICATIONS

Pedram Rezaei, Building a LINQ Provider, Aug. 3, 2010 (Retrieved Date), (23 pages).

Scott Guthrie, LINQ to SQL (Part 9—Using a Custom LINQ Expression with the <asp:LinqDatasource> control), Pub. Date: Sep. 7, 2007, (2 pages).

Erik Meijer, There is No Impedance Mismatch (Language Integrated Query in Visual Basic 9), Pub. Date: Oct. 2006 (2 pages).

SQL Server Management Objects (SMO): An Overview of SQL Server 2005 for the Database Developer, Retrieved Date: Aug. 4, 2010 (1 page).

On Separation between Interface, Implementation, and Representation in Object DBMS, Pub. Date: Aug. 3, 1998 (14 pages).

Managing the user environment, Retrieved Date: Aug. 4, 2010, (2 pages).

SQL Server Analysis Services Data Portability Overview, Pub. Date: Jun. 10, 2010 (11 pages).

SMO (SQL Server Management Object) in SQL Server 2005/2008, Pub. Date: Jan. 17, 2010 (2 pages).

John D. Poole, Model-Driven Architecture: Vision, Standards and Emerging Technologies, Pub. Date Apr. 2001 (15 pages).

A Metadata Based Architectural Model for Dynamically Resilient Systems, Pub. Date: Mar. 11-15, 2007, (8 pages).

E. James Whitehead, Jr., Design Spaces for Link and Structure Versioning, Aug. 5, 2010 (Retrieved Date), (10 pages).

Metadata Services (MDS) in Fusion Middleware 11g, Aug. 5, 2010 (Retrieved Date), (24 pages).

"Second Office Action Received for China Application No. 201110307749.7", Mailed Date: Oct. 15, 2013, Filed Date: Sep. 28, 2011, 06 Pages.

"Third Office Action and Search Report Received for China Application No. 201110307749.7", Mailed Date: Apr. 22, 2014, Filed Date: Sep. 28, 2011, 14 Pages.

"Office Action issued in Chinese Patent Application No. 201110307749.7", Mailed Date: Mar. 24, 2015, 10 Pages.

"Fourth Office Action Received for Chinese Patent Application No. 201110307749.7", Mailed Date: Nov. 3, 2014, 10 Pages.

* cited by examiner

DYNAMIC DOMAIN QUERY AND QUERY TRANSLATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, client computer systems may be configured to request and receive services or software applications hosted by a back-end server. In some cases, the client system may have a user interface that presents options provided by the service hosted by the back-end server. When not properly updated, or when different versions of the back-end server are used, this user interface may display options for features that are not really being provided by the service hosted by the back-end server.

BRIEF SUMMARY

Embodiments described herein are directed to defining a query expression over a dynamic system model and to transforming a dynamically built query expression into a simplified, canonical form. In one embodiment, a computer system receives various user inputs that are to be included as part of a query expression for querying a dynamic system model. The dynamic system model is queryable to determine features provided by a service hosted by a back-end server. The computer system dynamically builds the query expression based on both the received inputs and the available features provided by the service as indicated by the dynamic system model. The query expression also includes metadata structures representing those features of the service which are provided by the service. The computer system also queries across the dynamic system model using the dynamically built query expression to retrieve and provide the service features requested in the received user input.

In another embodiment, a computer system receives various user inputs that are to be included as part of a query expression for querying a dynamic system model. The dynamic system model is queryable to determine features provided by a service hosted by a back-end server. The computer system dynamically builds the query expression based on both the received inputs and the available features provided by the service as indicated by the dynamic system model. The query expression also includes metadata structures representing those features of the service which are provided by the service. The computer system transforms the dynamically built query expression into a simplified, canonical form that is generically understandable by a plurality of different back-end servers. The computer system also queries across the dynamic system model using the dynamically built query expression to retrieve and provide the service features requested in the received user input.

In yet another embodiment, a computer system receives various user inputs that are to be included as part of a query expression for querying a dynamic system model. The dynamic system model is queryable to determine features provided by a service hosted by a back-end server. The computer system dynamically builds the query expression based on both the received inputs and the available features provided by the service as indicated by the dynamic system model. The query expression also includes metadata structures representing those features of the service which are provided by the service. The computer system queries across the dynamic system model using the dynamically built query expression to retrieve and provide the service features requested in the received user input. The computer system also maintains a portion of metadata information corresponding to the metadata structures through the processing of the query expression and attaches the metadata information to the results returned to the client to uniquely identify each object returned by the query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to defining a query expression over a dynamic system model and to transforming a dynamically built query expression into a simplified, canonical form. In one embodiment, a computer system receives various user inputs that are to be included as part of a query expression for querying a dynamic system model. The dynamic system model is queryable to determine features provided by a service hosted by a back-end server. The computer system dynamically builds the query expression based on both the received inputs and the available features provided by the service as indicated by the dynamic system model. The query expression also includes metadata structures representing those features of the service which are provided by the service. The computer system also queries across the dynamic system model using the dynamically built query expression to retrieve and provide the service features requested in the received user input.

In another embodiment, a computer system receives various user inputs that are to be included as part of a query expression for querying a dynamic system model. The dynamic system model is queryable to determine features provided by a service hosted by a back-end server. The computer system dynamically builds the query expression based on both the received inputs and the available features provided by the service as indicated by the dynamic system model. The query expression also includes metadata structures representing those features of the service which are provided by the service. The computer system transforms the dynamically built query expression into a simplified, canonical form that is generically understandable by a plurality of different back-end servers. The computer system also queries across the dynamic system model using the dynamically built query expression to retrieve and provide the service features requested in the received user input.

In yet another embodiment, a computer system receives various user inputs that are to be included as part of a query expression for querying a dynamic system model. The dynamic system model is queryable to determine features provided by a service hosted by a back-end server. The computer system dynamically builds the query expression based on both the received inputs and the available features provided by the service as indicated by the dynamic system model. The query expression also includes metadata structures representing those features of the service which are provided by the service. The computer system queries across the dynamic system model using the dynamically built query expression to retrieve and provide the service features requested in the received user input. The computer system also maintains a portion of metadata information corresponding to the metadata structures through the processing of the query expression and attaches the metadata information to the results returned to the client to uniquely identify each object returned by the query.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
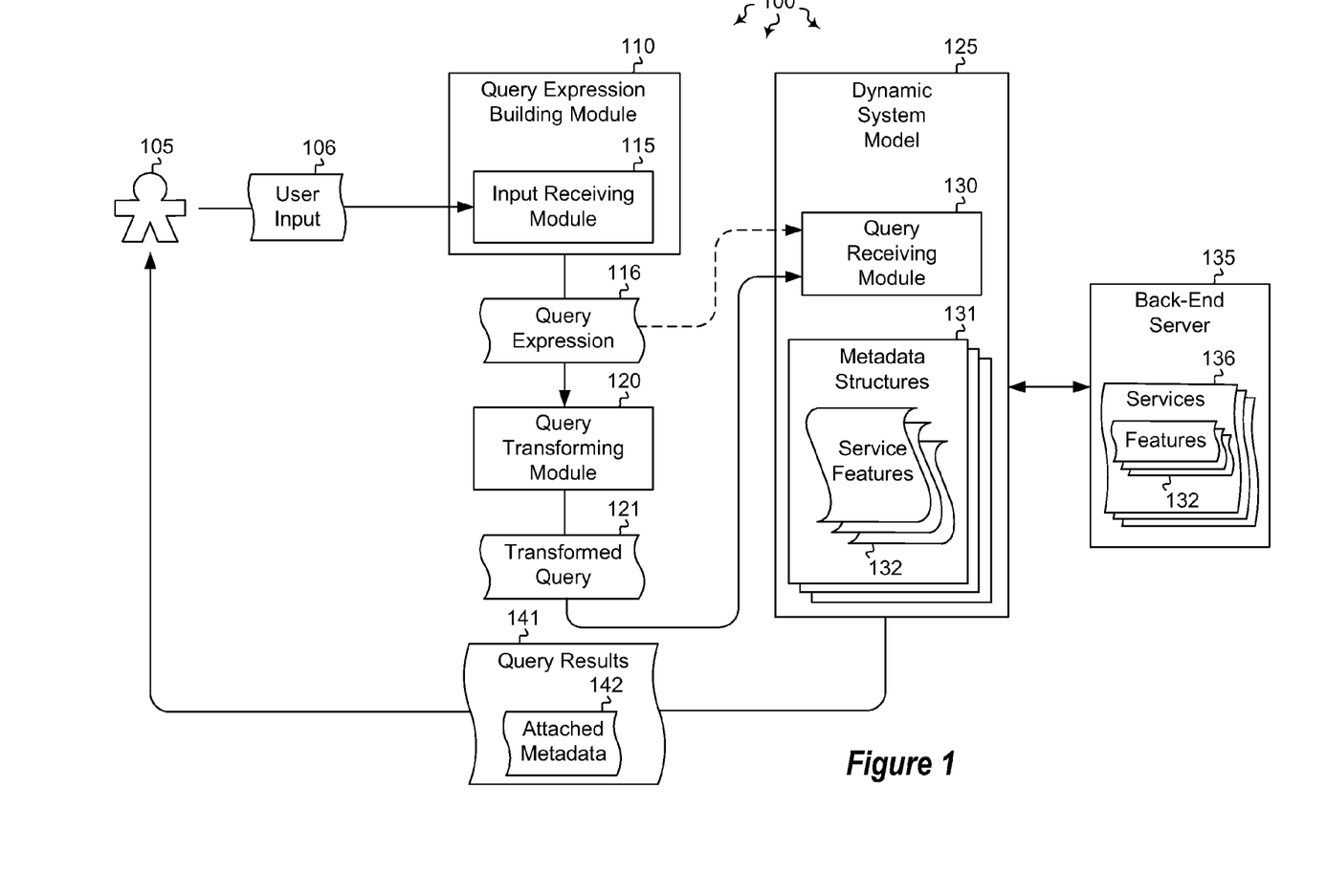
FIG. 1 illustrates a computer architecture in which embodiments of the present invention may operate including defining a query expression over a dynamic system model.

FIG. 1 illustrates a computer architecture 100 in which the principles of the present invention may be employed. Computer architecture 100 includes back-end server 135. The back-end server may be any type of computer system including a database, a service provider, application server or any other type of server or managed computer system. The back-end server may provide one or more services 136, where each of the services provides different features 132 or service operations. These features may be provided individually or collectively as part of a service.

The back-end server may be represented by dynamic system model 125. Dynamic system model may be a dynamically changeable model that is changeable at runtime. The metadata structures 131 that define various managed system objects including service features, domains, types, type properties and type relationships, may be stored in the system model. Each of these service features, domains, types, type properties and type relations may be updated or changed dynamically. As such, when the model is connected to different back-end servers, the model can be updated to reflect those service features and other managed system objects that are provided by the different back-end servers.

In some cases, the various back-end servers implement different syntax, different protocols, different calling methods and other implementation differences. As such, when the dynamic system model is connected to different back-end servers (or different editions or versions of back-end servers), the syntax for a query may need to be changed, depending on which back-end server is currently in use. Thus, query expression building module 110 may be implemented to generate a proper query that will be understood by the currently-used back-end server. Input receiving module 115 of the query expression building module may be configured to receive user input 106 from user 105. The user may be any type of computer user including an end-user, a developer, an administrator or other user. The input may be any type of database or other data request requesting information from the back-end server. In some cases, the request is specific to a service offered by the back-end server that the user is currently using.

The query expression building module may be configured to take the user's data request and generate a query expression 116. This dynamically built query expression may be sent to query transforming module 120 for transforming into a simple, canonical form. This transformed query 121 may be sent to query receiving module 130 of the dynamic system model, where the query can be run by the system model against the back-end server. The query may be translated by the dynamic system model into standard back-end syntax that is understandable by the back-end server 135. The results of the query 141 may then be sent via the system model to the user. The query results may include additional portions of attached metadata 142. The attached metadata may include identification information that uniquely identifies each object returned by the query.

In some cases, the computing environment 100 of FIG. 1 is generally configured to separate expression of a query from the execution of the query. An expression tree (e.g. query expression 116) can be built dynamically and is defined in terms of the underlying dynamic system model. The query expression may be composed incrementally allowing the user to keep augmenting it until he or she decides to execute the expression. The execution model separates back-end specific logic into a provider component that can be changed for different back-ends. The provider translates the generic model-oriented query expression into a back-end specific syntax and returns results 141 to the user.

In some embodiments, a query expression may be defined over a dynamic system model. The dynamic system model may be expressed as a set of metadata structures 131. Each metadata structure may represent a type, or a property on a type or a relationship. The metadata structures may change during the application runtime, as the dynamic system model is adapted to variations of back-end systems to which the model is connected. The client code (e.g. user input 106) may define the query expression 116 by referencing the metadata structures. Thus, at least in some embodiments, only the valid system metadata can be queried since only those metadata structures are visible to the client. Moreover, the metadata information 142 may be carried all the way through query processing and attached to the returned results 141 to correctly identify them. Still further, defining a query by building an expression tree in terms of the metadata structures provides true dynamicity: the client need not know particular elements of the model at the time the client application is written. In some cases, the client need only know that dynamic system models are expressed as entities (e.g. managed system objects) and relations.

Custom expression operators may be defined which allow client code to build an expression at the model abstraction level, using model relations as a primary way to define the query structure. The internal expression may include more information than the client code specified, such as required type properties, expansion of relations into required key values, automatic pre-population of parent relations, and more. At least in some cases, that information is retrieved from model metadata 131. Processing in this manner ensures that the final query expression tree includes the information needed to convert the tree to a native back-end request, yet at least some of the details for conversion do not need to be specified by the client code.

Figure 3:
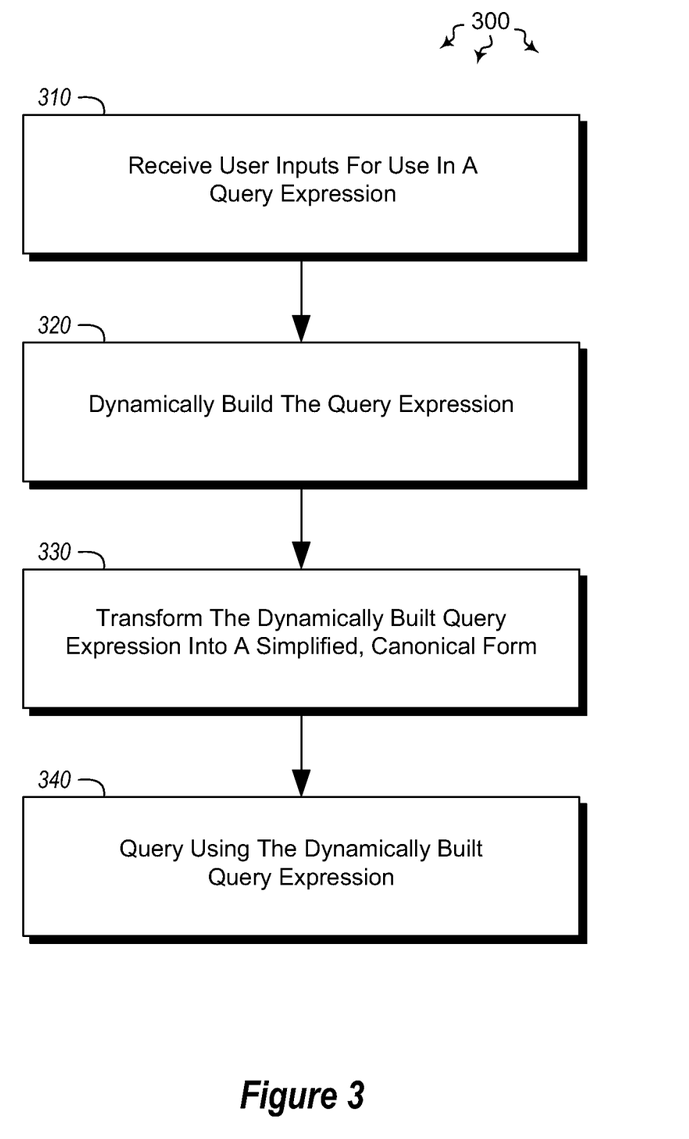
FIG. 3 illustrates a flowchart of an example method for transforming a dynamically built query expression into a simplified, canonical form.
Figure 4:
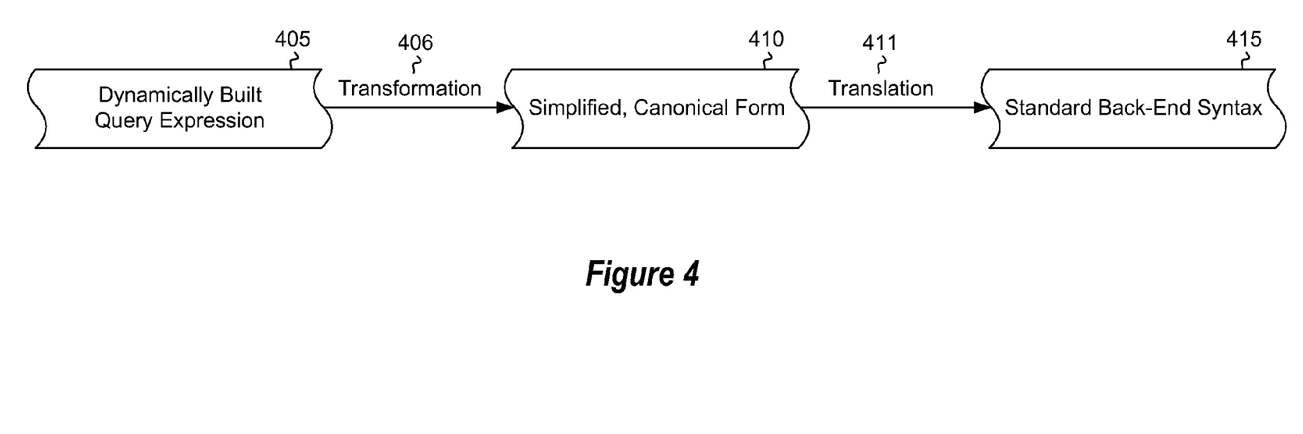
FIG. 4 illustrates an embodiment of the present invention in which a dynamically built query expression is transformed to a simplified, canonical form and translated to standard back-end syntax.

As shown in FIG. 4, a dynamically built query expression 405 may be translated into a back-end specific request 415. The processing of the query expression starts when the client code begins enumeration or transformation of the query tree. Upon transformation 406, a query processor brings the query expression to a simplified, canonical form 410, and then analyzes it to determine to which instance of a provider component to pass the query. The provider component serves as an intermediary between the generic query processing and back-end specific implementation. The provider component uses a set of mapping files to convert or translate 411 the expression to standard back-end syntax 415. The standard syntax query is passed to the back-end server and the results are returned to the provider component. As the results 141 are passed back to the client 105, the results may be annotated with metadata structures 142 that allow the client code to identify the meaning of the returned data and associate records with system model objects. These and other concepts will be explained in greater detail below with regard to methods 200 and 300 of FIGS. 2 and 3, respectively.

Figure 2:
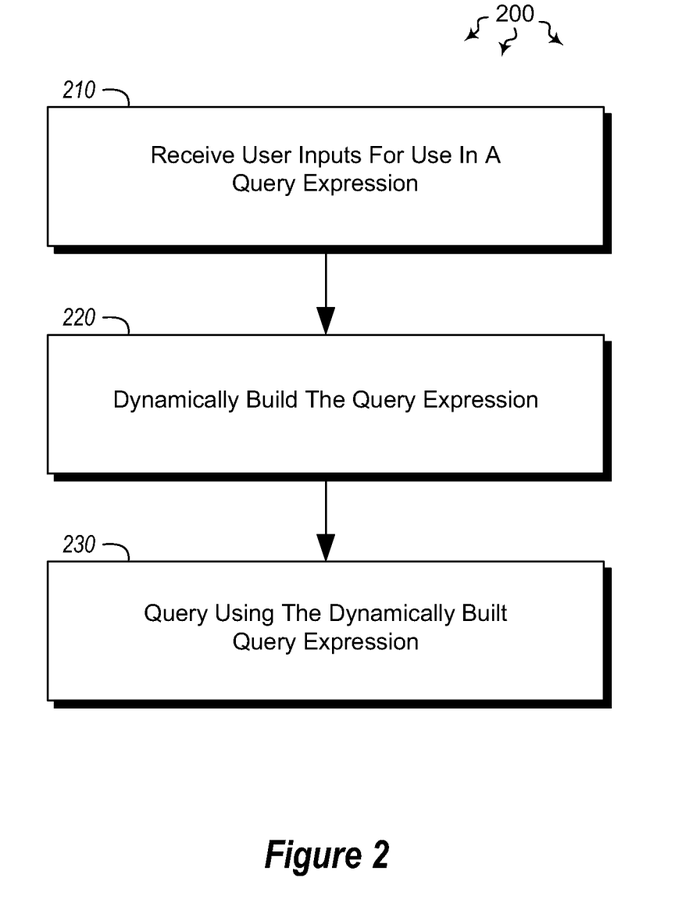
FIG. 2 illustrates a flowchart of an example method for defining a query expression over a dynamic system model.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for defining a query expression over a dynamic system model. The method 200 will now be described with frequent reference to the components and data of environment 100.

Method 200 includes an act of receiving one or more user inputs that are to be included as part of a query expression for querying a dynamic system model, wherein the dynamic system model is queryable to determine features provided by a service hosted by a back-end server (act 210). For example, input receiving module 115 may receive user input 106 which is to be included as part of query expression 116. The query expression (also referred to herein as an expression tree) may be used to query dynamic system model 125. The dynamic system model may be queryable to determine features 132 and/or managed system objects provided by services 136 hosted on back-end server 135.

In some cases, features of a service may be added or removed during runtime. Moreover, other back-end system objects (e.g. types, type properties and type relationships) may also change during runtime. The dynamic system model may correspondingly be changed during runtime to reflect the changes made on the back-end server. Still further, the back-end system itself may be changed so that a different edition or version is used. The dynamic system model may similarly be updated to reflect the new edition or version of the back-end server. Thus, the dynamic system model is designed to work on multiple different service and back-end versions.

In cases where the model provides support for a user interface, the features provided by the service 136 may be displayed as options on the user interface. The user interface may receive multiple different requests including a subsequent request from the user indicating that the results of the query 141 are to be filtered. Based on such a filter request, the dynamic system model may dynamically change the results of the query so that only results matching the filter are shown to the user in the user interface.

Method 200 includes an act of dynamically building the query expression based on both the received inputs and the available features provided by the service as indicated by the dynamic system model, wherein the query expression includes metadata structures representing those features of the service which are provided by the service (act 220). For example, query expression building module 110 may dynamically build query expression 116 based on both user code 106 and the available features 132 provided by service 136 as indicated in the metadata structures 131 of system model 125. The metadata structures represent those features of the service which are provided by the service. The features may include a portion of a service or an entire service itself. The metadata structures may represent service features 132 as well as managed system or back-end server objects including types, type properties and relationships. As indicated above, these types, type properties and relationships may change during runtime. These changes are then reflected in the updated, dynamically changeable system model.

Method 200 includes an act of querying across the dynamic system model using the dynamically built query expression to retrieve and provide the service features requested in the received user input (act 230). For example, the query expression 116 may be used to query across dynamic system model 125 to retrieve and provide the service features 132 requested by the user input 106. In some cases, custom query operators may be implemented in the query to retrieve and provide the service features required in the received user input. The custom query operators may be configured to query for a list of objects representing the features of the service provided by the back-end server without knowing what those objects will be. This may be made possible by the dynamic system model, as it provides a layer of abstraction between the query and the back-end server.

In some cases, custom query operators may query for a list of objects representing the features of the service provided by the back-end server without knowing what those objects will be by traversing one or more relationships among the metadata structures that define the features of the service. The custom query operators may traverse the metadata structure relationships using at least a portion of standard query syntax (e.g. 415). As the dynamically built query expression is converted to a native back-end request, the same query expression may be used against a plurality of different back-end systems (and their corresponding dynamic system models). Metadata information corresponding to the metadata structures may be maintained throughout the processing of the query expression. The maintained metadata may be attached 142 to the results 141 returned to the client 105 to uniquely identify each object returned by the query.

Turning now to FIG. 3, FIG. 3 illustrates a flowchart of a method 300 for transforming a dynamically built query expression into a simplified, canonical form. The method 300 will now be described with frequent reference to the components and data of environment 100.

Method 300 includes an act of receiving one or more user inputs that are to be included as part of a query expression for querying a dynamic system model, wherein the dynamic system model is queryable to determine features provided by a service hosted by a back-end server (act 310). For example, user input 106 may be received at input receiving module 115, where the user input is to be included as part of query expression 116 for querying dynamic system model 125. The dynamic system model is queryable to determine which features are provided by service 136 which is hosted by back-end server 135. Because the dynamic system model may be updated dynamically during runtime, the dynamically built query expression may also be changed during runtime up until the query is actually executed.

Method 300 includes an act of dynamically building the query expression based on both the received inputs and the available features provided by the service as indicated by the dynamic system model, wherein the query expression includes metadata structures representing those features of the service which are provided by the service (act 320). For example, query expression building module 110 may dynamically build query expression 116 based on user input 106 and available service features 132 provided by service 136, as indicated by the metadata structures 131 of the system model. As indicated above, the metadata may be maintained and appended to query results, thus allowing a user to identify each query result as being associated with a given query expression.

Method 300 includes an act of transforming the dynamically built query expression into a simplified, canonical form that is generically understandable by a plurality of different back-end servers (act 330). For example, dynamically built query expression 116 may be transformed by query transforming module 120 into a simplified, canonical form (e.g. transformed query 121) that is generally understandable by multiple different back-end server editions and/or versions. In some cases, either or both of query expression 116 and transformed query 121 may be sent to query receiving module 130 of the dynamic system model. The system model may then use the query to access data stored on the back-end server. In some embodiments, the simplified, canonical form 410 may be further translated 411 to standard back-end syntax, standard to the current version or edition of back-end server being used.

In some cases, a user may provide input indicating a string name of a model object stored in the dynamic system model.

The system model may then locate the metadata object corresponding to the received string name. Moreover, in some cases, various bindings may be created to link a corresponding metadata object to the received string name. Thus, the bindings may be implemented to create the simplified, canonical form of the query expression.

Method 300 also includes an act of querying across the dynamic system model using the dynamically built query expression in its simplified, canonical form to retrieve and provide the service features requested in the received user input (act 340). For example, the transformed simplified, canonical query expression 410 may be used to query across the dynamic system model 125 to retrieve and provide those service features 132 requested in user input 106. In this manner, a user can request resources from a dynamically changeable system model that can change each time a new back-end server is used or when services or features of the back-end server change. Moreover, the user's query can be transformed and/or translated as necessary to complete the user's request for resources.

Accordingly, methods, systems and computer program products are provided which define a query expression over a dynamic system model, where the query expression can be changed dynamically at runtime until the query is executed. Moreover, methods, systems and computer program products are provided which transform a dynamically built query expression into a simplified, canonical form, before translating the query into back-end specific query syntax.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer networking environment that includes one or more back-end servers providing services and including a plurality of computing systems each having a processor and a memory, with one or more computer systems requesting services from at least one of the back end servers when connected to the networking environment, a computer-implemented method for retrieving and providing features provided by one or more services offered by one or more of the back end servers, the method comprising acts of:

executing a dynamic system model for communicating with one or more back-end servers in a network, the dynamic system model comprising metadata structures that define service features for one or more services provided by one or more of the back-end servers and, for each of the one or more of the back-end servers, define a back-end specific syntax understood by the each back-end server, the back-end specific syntax used to invoke and use the services provided by the each back-end server;

connecting the dynamic system model to one or more of the back-end servers in the network at runtime, and dynamically updating the metadata structures at runtime to reflect current service features for one or more services offered by one or more of the back-end servers;

receiving at a query expression module user input that is to be translated into a proper query syntax and included as part of a query expression used for retrieving service features for one or more services provided by one or more of the back-end servers;

connecting the query expression module to the dynamic system model and dynamically building the query expression based on both the user input and information received from the dynamic system model as to available features provided by one or more of the services of one or more of the back-end servers as indicated at runtime by the dynamic system model;

executing the dynamically built query expression by sending it to the dynamic system model where the dynamically built query is translated into the back-end specific syntax to run a query on at least one of the one or more of the back-end servers using the back-end specific syntax to retrieve, invoke, and provide the features of the service which are the subject of the query based on the user input and access data stored on the at least one of the one or more of the back-end servers; and the dynamic system model returning the results of the query to the user.

2. The method of claim 1, wherein one or more custom query operators are implemented in the dynamically built query expression.

3. The method of claim 2, wherein the custom query operators query for a list of objects representing one or more of the features of one or more services provided by one or more back-end servers without knowing what those objects will be.

4. The method of claim 3, wherein the custom query operators query for a list of objects representing one or more of the features of one or more services provided by the one or more back-end servers without knowing what those objects will be by traversing one or more relationships among the metadata structures of the dynamic system model.

5. The method of claim 4, wherein the custom query operators traverse the metadata structure relationships using at least a portion of standard query syntax.

6. The method of claim 1, wherein dynamically updating the metadata structures at runtime to reflect current service features for one or more services offered by one or more of the back-end servers comprises adding or removing one or more features of at least one of the services.

7. The method of claim 1, wherein the features provided by one or more of the services are displayed as options on a user interface displayed to the user.

8. The method of claim 7, further comprising:

an act of receiving a subsequent request from the user at the user interface indicating that the results of the query are to be filtered; and based on the received filter request, an act of dynamically changing the results of the query such that only results matching the filter are shown to the user in the user interface.

9. The method of claim 1, wherein each of the metadata structures represents at least one of a type, a property of a type and a relationship.

10. The method of claim 9, wherein at least one of the type, type property and relationship changes during runtime.

11. The method of claim 1, wherein returning to the user the results of the query comprises attaching to the results metadata corresponding to the metadata that were the subject of the dynamically built query expression.

12. The method of claim 1, wherein the dynamically built query expression is converted to a native back-end request.

13. The method of claim 1, wherein the dynamic system model is designed to work on multiple different service versions.

14. In a computer networking environment that includes one or more back-end servers providing services and including a plurality of computing systems each having a processor and a memory, with one or more computer systems requesting services from at least one of the back end servers when connected to the networking environment, a computer program product for implementing a method for retrieving and providing features provided by one or more services offered by one or more of the back end servers, the computer program product comprising one or more computer-readable hardware storage devices having stored thereon computer-executable instructions that, when executed by one or more processors of a computing system, cause the computing system to perform the method, the method comprising acts of:

executing a dynamic system model for communicating with one or more back-end servers in a network, the dynamic system model comprising metadata structures that define service features for one or more services provided by one or more of the back-end servers and, for each of the one or more of the back-end servers, define a back-end specific syntax understood by the each back-end server, the back-end specific syntax used to invoke and use the services provided by the each back-end server;

connecting the dynamic system model to one or more of the back-end servers in the network at runtime, and dynamically updating the metadata structures at runtime to reflect current service features for one or more services offered by one or more of the back-end servers;

receiving at a query expression module user input that is to be translated into a proper query syntax and included as part of a query expression used for retrieving service features for one or more services provided by one or more of the back-end servers;

connecting the query expression module to the dynamic system model and dynamically building the query expression based on both the user input and information received from the dynamic system model as to available features provided by one or more of the services of one or more of the back-end servers as indicated at runtime by the dynamic system model;

translating the dynamically built query expression into a syntax comprising a simplified, canonical form that is understandable by a plurality of the one or more back-end servers;

executing the dynamically built query expression by sending it to the dynamic system model where the dynamically built query is then used in its simplified, canonical form to run a query across the dynamic system model to invoke, retrieve, and provide the features of the service which are the subject of the query based on the user input and access data stored on the one or more of the back-end servers; and     the dynamic system model then returning the results of the query to the user.

15. The computer program product of claim 14, wherein the user input includes a string name of a model object.

16. The computer program product of claim 15, further comprising including the string name in the dynamically built query expression which is executed to identify current service features for one or more services offered by the one or more back-end servers, and using the string name to locate at the dynamic system model a metadata object corresponding to the string name.

17. The computer program product of claim 16, further comprising an act of creating one or more bindings to link the corresponding metadata object to the string name, wherein the bindings are implemented to create the simplified, canonical form of the dynamically built query expression.

18. The computer program product of claim 17, further comprising translating the simplified, canonical form of the dynamically built query expression into back-end specific query syntax.

19. In a computer networking environment a system comprising:

a network comprised of one or more back-end servers providing services;

a plurality of computing systems each having a processor and a memory, with one or more computer systems requesting services from at least one of the back end servers when connected to the network;

one or more computer-readable storage media having stored thereon computer-executable instructions that, when executed by the one or more processors, causes the computing system to perform a method for retrieving and providing features provided by one or more services offered by one or more of the back end servers, the method comprising the following acts:

executing a dynamic system model for communicating with one or more back-end servers in a network, the dynamic system model comprising metadata structures that define service features for one or more services provided by one or more of the back-end servers—and, for each of the one or more of the back-end servers, define a back-end specific syntax understood by the each back-end server, the back-end specific syntax used to invoke and use the services provided by the each back-end server;

connecting the dynamic system model to one or more of the back-end servers in the network at runtime, and dynamically updating the metadata structures at runtime to reflect current service features for one or more services offered by one or more of the back-end servers;

receiving at a query expression module user input that is to be translated into a proper query syntax and included as part of a query expression used for retrieving and providing service features for one or more services provided by one or more of the back-end servers;

connecting the query expression module to the dynamic system model and dynamically building the query expression based on both the user input from a user and information received from the dynamic system model as to available features provided by one or more of the services of one or more of the back-end servers as indicated at runtime by the dynamic system model;

executing the dynamically built query expression by sending it to the dynamic system model where the dynamically built query is translated into the back-end specific syntax to run a query on at least one of the one or more of the back-end servers using the back-end specific syntax to retrieve, invoke, and provide the features of the service which are the subject of the query based on the user input and access data stored on at least one of the one or more of the back-end servers; and         the dynamic system model then returning the results of the query to the user.

\* \* \* \* \*